United States Patent Office 3,714,034
Patented Jan. 30, 1973

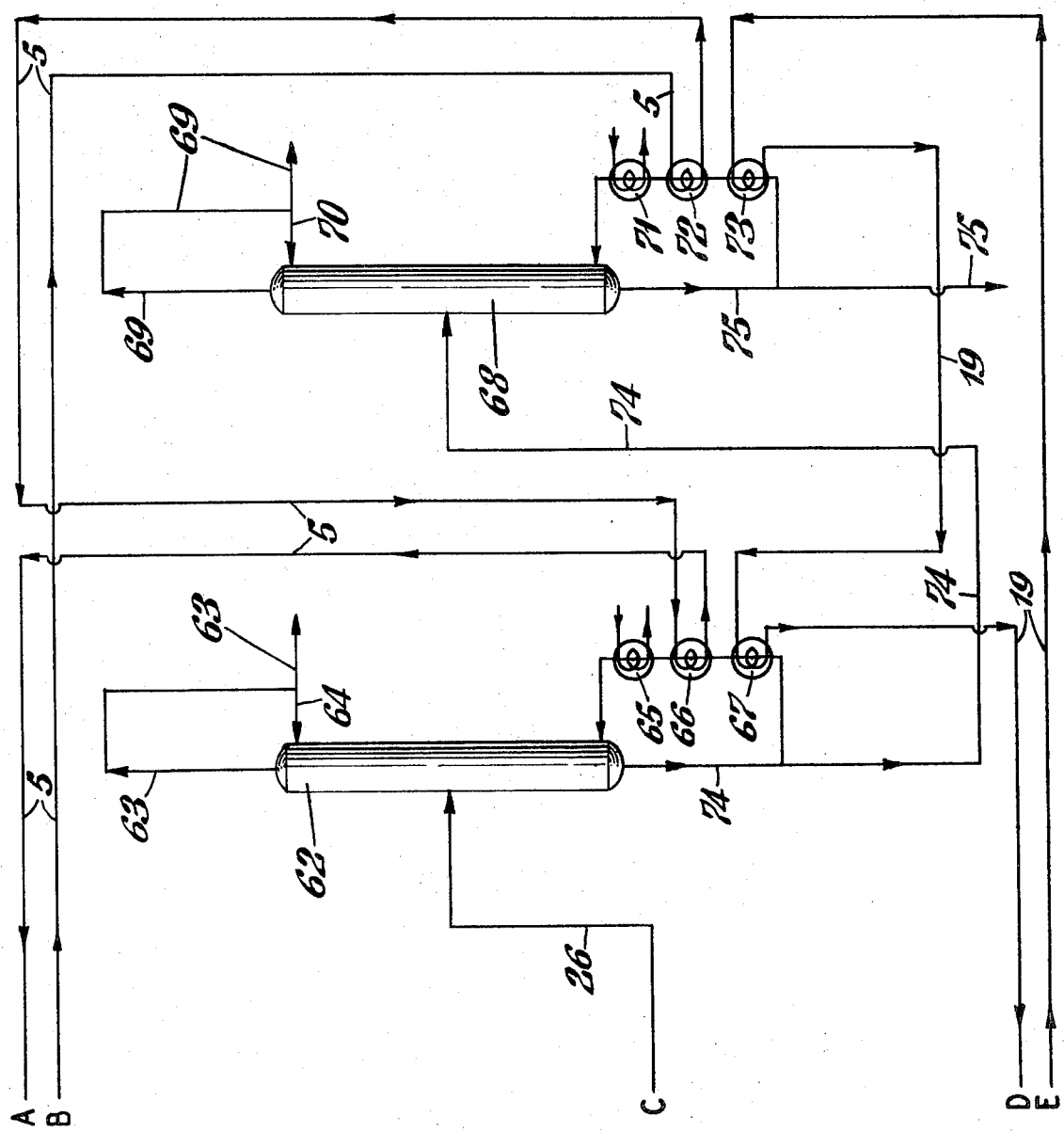

3,714,034
PROCESS FOR THE SEPARATION OF AROMATIC HYDROCARBONS FROM A MIXED HYDROCARBON FEEDSTOCK
Alexander Jean-Marie Kosseim, Yorktown Heights, Daniel John Kubek, North Tarrytown, and George Solomon Somekh, New Rochelle, N.Y., assignors to Union Carbide Corporation, New York, N.Y.
Filed Dec. 13, 1971, Ser. No. 207,055
Int. Cl. C10g 21/28
U.S. Cl. 208—321
24 Claims

ABSTRACT OF THE DISCLOSURE

A continuous solvent extraction-steam distillation process for the recovery of aromatic hydrocarbons from a mixed feedstock. The feedstock is contacted with a solvent-water mixture at temperatures in the range of about 75° C. to 200° C. and the extract and raffinate streams are separated into their components. Heat for the various distillation zones is partially supplied by heat exchange with the extract and raffinate streams.

FIELD OF THE INVENTION

This invention relates to an improvement in a process for the separation of aromatic hydrocarbons from a mixed hydrocarbon feedstock and, more particularly, to the recovery of high purity aromatic hydrocarbons in high yields while making efficient use of process components.

DESCRIPTION OF THE PRIOR ART

With the advent of the benzene-toluene-$C_8$ aromatics fraction (known and hereinafter referred to as BTX) as the principal raw material in the manufacture of petrochemicals, outstripping ethylene in this regard, and the increased demand for aromatics as a component in gasoline to increase its octane rating and thus reduce or eliminate the need for lead, which has been under fire as a pollutant, aromatics separation processes availed of in the past have come under close scrutiny with an eye toward improving process economics.

Improved process economics can be translated into, among other things, the lowering of heating requirements and the more effective use of process components.

Our application Ser. No. 180,996 filed on Sept. 16, 1971, which is incorporated by reference herein, improves purity and process economics by a novel technique of washing to remove aliphatic impurities. This technique is found to be very successful, especially with respect to purity; however, the ever increasing cost of fuel for process heat makes it imperative to explore further reductions in heating requirements through even more effective use of process components. One particular drain on heating efficiency is the flashing which takes place in the distillation column due to the high temperature of the extractor and the lower pressure of the distillation column in relation to the extraction column.

SUMMARY OF THE INVENTION

An object of this invention, therefore, is to provide an improvement in a process for the separation of aromatic hydrocarbons from a mixed hydrocarbon feedstock in which a solvent-water composition is utilized whereby aromatics are recovered in high purity using a minimum of heat from outside sources, making more effective use of process components, and substantially eliminating flashing in the aromatics distillation column.

Other objects and advantages will become apparent hereinafter.

According to the present invention, high purity aromatic hydrocarbons are effectively recovered using minimal heat and flashing substantially eliminated by a continuous solvent extraction-steam distillation process for the recovery of aromatic hydrocarbons including benzene and toluene having boiling points in the range of about 80° C. to about 175° C. from a feedstock containing aliphatic hydrocarbons and said aromatic hydrocarbons comprising the following steps:

(a) contacting the feedstock in an extraction zone wherein the temperature is in the range of about 75° C. to about 200° C. with a mixture of water and a solvent, said solvent being a water-miscible organic liquid having a boiling point of at least about 200° C. and having a decomposition temperature of at least about 225° C., and with reflux hydrocarbons to provide an extract comprising aromatic hydrocarbons, reflux aliphatic hydrocarbons, solvent, and water and a raffinate comprising essentially aliphatic hydrocarbons;

(b) contacting the extract with steam in an aromatics distillation zone wherein the temperature is in the range of about 80° C. to about 200° C. to provide an overhead distillate comprising a reflux hydrocarbons phase and a water phase, a side cut distillate comprising an aromatic hydrocarbons phase and a water phase, and bottoms comprising a mixture of solvent and water;

(c) dividing the water phase of the overhead distillate into first and second streams;

(d) contacting the raffinate with the first stream to provide an aliphatic hydrocarbons phase and a water phase;

(e) contacting the second stream with an aromatic hydrocarbons stream containing at least 95 percent aromatic hydrocarbons, the amount of said stream being in the range of about 0.1 percent to about 5 percent by weight of the total aromatic hydrocarbons in the feedstock, to form an aromatic hydrocarbons phase and a water phase;

(f) contacting the aromatic hydrocarbons phase of the side-cut distillate with the water phase of (e) to form an aromatic hydrocarbons phase and a water phase;

(g) contacting the water phase of step (d) with an aromatic hydrocarbons stream containing at least 95 percent aromatic hydrocarbons, the amount of said stream being in the range of about 0.1 percent to about 5 percent by weight of the total aromatic hydrocarbons in the feedstock, to form an aromatic hydrocarbons phase and a water phase;

(h) recycling the water phases of steps (f) and (g) to the aromatics distillation zone;

(i) recycling the reflux hydrocarbons phase of the overhead distillate and the bottoms of step (b) to the extraction zone to provide reflux hydrocarbons and mixture of water and solvent, respectively, for step (a);

(j) recovering the aliphatic hydrocarbons phase of step (d);

(k) introducing the aromatic hydrocarbons phase formed in step (f) into a benzene distillation zone wherein the temperature is at least as high as the boiling point of benzene and the pressure at the top of the zone is about 1 p.s.i.a. to about 12 p.s.i.a., and recovering the benzene as overhead therefrom;

(l) introducing the balance of the aromatic hydrocarbons from step (k) into a toluene distillation zone wherein the temperature is at least as high as the boiling point of toluene and the pressure at the top of the zone is about 1 p.s.i.a. to about 12 p.s.i.a., and recovering the toluene as overhead therefrom; and (m) recovering the balance of the aromatic hydrocarbons from step (l);

wherein:

(i) prior to step (a), the feedstock is heated to a temperature in the range of about 50° C. to about 150° C. by heat exchange with one of the members of the group consisting of the overhead distillate and the raffinate;

(ii) prior to step (h), the water phases formed in steps (f) and (g) are converted to steam at least in part by heat exchange with the side-cut distillate; and (iii) prior to step (b), portions of the bottoms from the benzene distillation zone and the toluene distillation zone are heated by heat exchange with at least one member of the group consisting of the extract and the raffinate and recycled to their respective zones to provide about half of the heating requirement for that zone.

BRIEF DESCRIPTION OF THE DRAWING

The figure is a schematic flow diagram of an illustrative embodiment of the present invention divided for convenience into $a$ and $b$ portions with connecting points A, B, C, D, and E shown.

DESCRIPTION OF THE PREFERRED EMBODIMENT

Figure 1A:
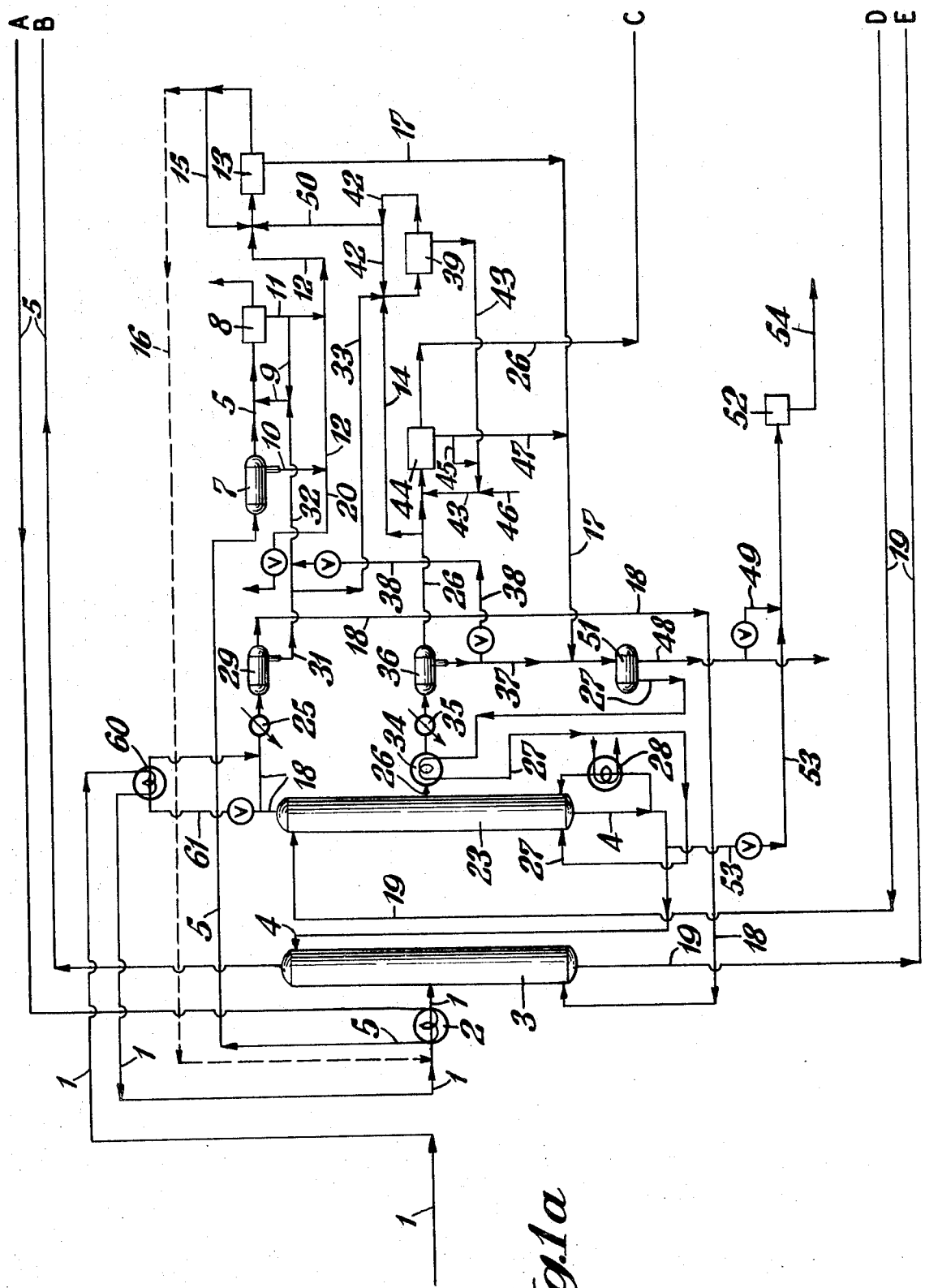

As noted above, there is an industrial need for BTX, which is available in high proportion, e.g., greater than 30 percent by weight, in a wide variety of hydrocarbon feedstocks such as reformed gasolines; coke oven light oils; cracked gasolines; and dripolenes, which, after hydrogenation, can contain as much as 70 to 98 percent BTX. These feedstocks also contain both aliphatic and cycloaliphatic hydrocarbons (herein sometimes referred to collectively as aliphatic hydrocarbons). Since the individual hydrocarbon compounds which make up these feedstocks are well known, they will not be discussed extensively; however, it can be pointed out that the major components of the feedstocks used herein are hydrocarbons with boiling points ranging from 25° C. to 175° C. including straight-chain and branched-chain paraffins and naphthenes, such as n-heptane, isooctane, and methyl cyclohexane, and aromatics such as BTX.

The BTX fraction can include benzene, toluene, the $C_8$ aromatics including ortho-xylene, meta-xylene, para-xylene, and ethyl benzene, and $C_9$ aromatics, which, if present at all, appear in the smallest proportion in relation to the other components.

The solvents used in subject process are, as described above, water-miscible organic liquids (at process temperatures) having a boiling point of at least about 200° C. and having a decomposition temperature of at least about 225° C. The term "water-miscible" includes those solvents which are completely miscible over a wide range of temperatures and those solvents which have a high partial miscibility at room temperature since the latter are usually completely miscible at process temperatures. The solvents are also polar and are generally comprised of carbon, hydrogen and oxygen with some exceptions. Examples of solvents which may be used in the process of this invention are dipropylene glycol, tripropylene glycol, dibutylene glycol, tributylene glycol, ethylene glycol, diethylene glycol, ethylene glycol monomethy ether, ethylene glycol monoethyl ether, diethylene glycol monomethyl ether, diethylene glycol monoethyl ether, sulfolane, N-methyl pyrrolidone, triethylene glycol, tetraethylene glycol, ethylene glycol diethyl ether, propylene glycol monoethyl ether, pentaethylene glycol, hexaethylene glycol, and mixtures thereof. The preferred group of solvents is the polyalkylene glycols and the preferred solvent is tetraethylene glycol.

Additional solvents, which may be used alone or together, or with the aforementioned solvents are amides such as formamide, acetamide, dimethylformamide, diethylformamide, and dimethylacetamide; amines such as diethylenetriamine and triethylenetetramine; alkanolamines such as monoethanolamine, diethanolamine, and triethanolamine; nitriles such as beta,beta$^1$-oxydipropionitrile and beta,beta$^1$ - thiodipropionitrile; phenol and the cresols; the methyl sulfolanes; sulfoxides such as dimethyl sulfoxide and diethyl sulfoxide; lactones such as gamma-propiolactone and gamma-butyrolactone.

The apparatus used in the process both for the main extraction and the distillations is conventional, e.g., an extraction column of the multistage reciprocating type containing a plurality of perforated plates centrally mounted on a vertical shaft driven by a motor in an oscillatory manner can be used as well as columns containing pumps with settling zones, sieve trays wtih upcomers, or even a hollow tube while the distillation can be conducted in a packed or bubble plate fractionating column. Counter-current flows are utilized in both extraction and distillation columns.

Heat exchangers, decanters, reservoir and solvent regenerator are also conventional as well as various extractors other than the main extractor. These other extractors are preferably single stage mixer-settlers, but can be any of the well known types.

The solvent is used as an aqueous solution thereof containing water in an amount of about 1 percent to about 8 percent by weight based on the weight of the solvent and preferably containing water in an amount of about 2 percent to about 5 percent by weight. This aqueous solution is referred to hereafter in some instances as a solvent-water mixture.

Generally, to accomplish the extraction, the ratio of solvent (exclusive of water) to feedstock in the extractor is in the range of about 4 to about 8 parts by weight of solvent to one part by weight of feedstock. This broad range can be expanded upon where nonpreferred solvents are used. A broad range of about 3 to about 12 parts by weight of solvent to one part by weight of feedstock and a preferred range of about 5 parts to about 7 parts of solvent per part of feedstock can be used successfully for the solvent of preference and other like solvents. In final analysis, however, the ratio is selected by the technician based on experience with the particular feedstock and depends in part upon whether high recovery or high purity is being emphasized, although the instant process will improve purity in any case.

The reflux to the extraction zone is generally made up of about 20 percent to about 50 percent by weight aliphatics having from 5 to 7 carbon atoms and about 50 percent to about 80 percent by weight aromatics, both based on the total weight of the reflux. The ratio of reflux to feedstock in the extraction zone is, generally, maintained in the range of about 0.5 to about 1.5 parts by weight of reflux to one part by weight of feedstock and preferably about 0.5 to about 1.0 parts by weight of reflux to one part by weight of feedstock, but, again, is selected by the technician just as the ratio of solvent to feedstock. The reflux aliphatics pass into the extract rather than being taken overhead with the raffinate and are recycled to the extractor from the reflux decanter as will be seen hereinafter.

The temperature in the extraction zone is maintained in the range of about 75° C. to about 200° C. and is preferably in the range of about 125° C. to about 150° C., especially for the solvent of preference.

The pressure in the extraction zone is maintained in the range of about 75 p.s.i.g. to about 200 p.s.i.g. As is well known in the art, however, one selected pressure is not maintained throughout the extraction zone, but, rather, a high pressure within the stated range is present at the bottom of the zone and a low pressure again within the stated range is present at the top of the zone with an intermediate pressure in the middle of the zone. The pressures in the zone depend on the design of the equipment and the temperature, both of which are adjusted to maintain the pressure within the stated range.

The temperature at the top of the aromatics distillation zone, which, in terms of the apparatus used, may be referred to as a distillation column or stripper, is at the boiling point of the mixture of aromatics present in the zone while the temperature at the bottom of the stripper is generally in the range of about 135° C. to about 200° C.

The pressure at the top of the stripper is in the range of about 15 p.s.i.g. to about 40 p.s.i.g. The pressure in the rest of the aromatics distillation zone is maintained in the range of about 15 p.s.i.g. to about 35 p.s.i.g. with some variation throughout the zone.

The steam brought into the bottom of the aromatics distillation zone enters at a temperature of about 100° C. to about 150° C. and is under a pressure of about 15 p.s.i.g. to about 35 p.s.i.g. The total water present in this distillation column is essentially in vapor form and is generally in the range of about 0.1 part to about 0.5 part by weight of water to one part by weight of aromatics in the zone and preferably in the range of about 0.1 part to about 0.3 part by weight of water to one part by weight of aromatics. The water used for the steam may be called stripping water. A small amount of water is present in liquid form in the aromatics distillation zone dissolved in the solvent.

Referring to the drawing:

The feedstock enters line 1 from an outside source (not shown) and is preheated to a temperature in the range of about 50° C. to about 150° C. either in heat exchanger 60 by heat exchange with the overhead distillate from aromatics distillation column (or stripper) 23 or in heat exchanger 2 by heat exchange with the raffinate from extractor 3. The feedstock then continues through line 1 to enter extractor 3 at about the middle tray thereof. The point of entry is not critical in this case, but is selected by the technician running the process on the basis of the feedstock used. An aqueous solvent solution having a temperature in the range of about 125° C. to about 200° C. enters at the top tray of extractor 3 through line 4 and percolates down the column removing aromatics from the feedstock.

The raffinate, essentially free of aromatics, passes up the column. It comprises about 95 percent to about 98 percent by weight aliphatics, about 1 percent to about 3 percent by weight dissolved and entrained solvent, and about 0 percent to about 3 percent by weight aromatics. The raffinate leaves the top of extractor 3 through line 5 and passes to heat exchanger 72, then to heat exchanger 66, and returns along line 5 to heat exchanger 2. After passing through the successive heat exchangers, the temperature of the raffinate is in the range of about 25° C. to about 50° C. It then proceeds along line 5 to decanter 7 where it separates into two phases, an aliphatic hydrocarbons phase and a solvent phase, the solvent being contaminated with aliphatics.

It should be noted that the "phase" is named after its main component, which is present in the phase in an amount of at least 50 percent by weight and, in most cases, in an amount of at least 90% by weight.

The aliphatic hydrocarbons phase, which can still be referred to as the raffinate, now contains about 96 percent to about 99 percent by weight aliphatics, about 0 percent to about 1 percent by weight dissolved and entrained solvent, and about 0 percent to about 3 percent by weight aromatics. The solvent phase, on the other hand, contains about 90 percent to about 96 percent by weight solvent, about 2 percent to about 5 percent by weight water, and about 2 percent to about 4 percent by weight aliphatics.

The raffinate continues overhead through line 5 into raffinate extractor 8, which can be a single stage mixer-settler or other conventional type of extractor.

The solvent phase passes through line 10 to join line 12 referred to hereinafter or it can be optionally recycled to the top of extractor 3 along line 20 (connection to extractor not shown)

The raffinate is washed with a portion of the water phase from reflux decanter 29 and separated in raffinate extractor 8 into an aliphatic hydrocarbons phase (still called the raffinate) which is essentially free of solvent and water and contains about 97 percent to about 100 percent by weight aliphatics and about 0 percent to about 3 percent by weight aromatics, and a water phase as bottoms which contains about 75 percent to about 90 percent by weight water, about 10 percent to about 25 percent by weight solvent, and about 0.1 percent to about 1 percent by weight aliphatics.

Part of this water phase can optionally be recirculated through extractor 8 via line 11, line 9 and line 5 as shown. This recirculation is conventional with a mixer-settler arrangement, but may not be advantageous with other types of extractors. As noted, the water phase still contains, along with the water and solvent, a small amount of aliphatics. All or the balance of the water phase is, therefore, directed from line 11 along line 12 to extractor 13, which can again be a single-stage mixer-settler.

Feeding into line 12 via line 50 is an aromatics slipstream, which at its source (see line 14) is an essentially pure stream of aromatics, i.e., having a purity of at least 95 percent by weight, or in other words, at least 95 percent by weight of the slipstream is aromatic hydrocarbons. The purity of the slipstream is preferably about 98 percent and for optimum performance, i.e., to obtain the highest purity product, about 99 percent. It is called a slipstream or sidestream because the amount of aromatics fed into the water phase passing through line 12 is very small. The amount of slipstream aromatic hydrocarbons used in the process is in the range of about 0.1 percent to about 5 percent by weight of the aromatic hydrocarbons in the feedstock and is preferably in the range of about 0.5 percent to about 2.0 percent by weight of such aromatic hydrocarbons. The slipstream washes the water in extractor 13 to remove the small amount of aliphatics, which is so detrimental to the efficiency of the process. This aromatics slipstream can be recycled along line 15 through extractor 13 to further wash the water phase where a mixer-settler extractor is used and it is then, preferably, sent along line 16 to line 1 where it is reintroduced into the feedstock and passes into the system once more. The water, which is essentially devoid of aliphatics, but contains solvent, then passes as bottoms from extractor 13 through line 17 and into water reservoir 51 via line 37.

Returning to extractor 3, it has been noted above that the aqueous solvent percolates down the column carrying with it the aromatics. In the lower half of extractor 3, the solvent solution of aromatics comes into countercurrent contact with a reflux liquid, which enters extractor 3 below the bottom tray along line 18. The reflux percolates up the lower half of extractor 3 progressively dissolving in and purifying the solvent solution of aromatics. The solution which is formed, i.e., the extract, comprises about 5 percent to about 10 percent by weight feedstock aromatics, about 2 percent to about 5 percent by weight water, about 75 percent to about 85 percent by weight solvent, about 4 percent to about 8 percent by weight reflux aromatics, and about 3 percent to about 6 percent by weight reflux aliphatics, all based on the total weight of the extract.

The extract leaves the bottom of extractor 3 through line 19 and passes first through heat exchanger 73 and then through heat exchanger 67. After passing through heat exchanger 67, the temperature of the extract is in the range of about 75° C. to about 175° C. The extract proceeds along line 19 and enters stripper 23 at the top plate thereof where there is substantially no flashing even though the pressure of the stripper is lower than that of the extractor. The extract percolates down the column into the fractionation zone where it comes into countercurrent contact with the stripping vapors, i.e., steam, and more vapors are generated. The vapors rise to the top of the column and become the overhead distillate which comprises about 40 to about 75 percent by weight aromatics, about 20 to about 40 percent aliphatics, about 2 percent to about 10 percent by weight water, and about 0 percent to about 5 percent by weight solvent, all based on the total weight of the overhead distillate.

After the aqueous solvent descends about halfway down the column, it becomes essentially free of aliphatics. At this point, a vapor side-stream distillate is removed through line 26. The side-stream distillate is comprised of about 65 to about 90 percent by weight aromatics, about 10 to about 30 percent by weight water, and about 1 percent to about 10 percent by weight of solvent, based on the total weight of the side-stream distillate.

The bulk of the solvent and water solution, an amount equal to over 99 percent by weight of the solvent and water entering stripper 23 through line 19, leaves the bottom of stripper 23 through line 4. A portion of this solution is diverted into reboiler 28 and returns as a vapor to a point below the bottom tray of stripper 23 to provide most of the stripper's heating requirements. The balance of the water and solvent solution is recycled to the top tray of extractor 3 through line 4. Recycled stripping water containing some dissolved solvent enters stripper 23 through line 27 from water reservoir 51 after part (about half) of it is converted in heat exchanger 34 to steam. The balance is converted to steam in the distillation column or, optionally, by additional heat applied outside the column in a conventional manner.

Returning to the overhead distillate mentioned heretofore, such overhead distillate is comprised of fractionated vapors having the aforementioned composition. This overhead distillate is also known as reflux distillate. The vapor is first condensed and cooled to between about 38° C. and 94° C. in reflux condenser 25. The condensate then passes into reflux decanter 29 where a reflux hydrocarbons phase is decanted from a water phase. The reflux hydrocarbons phase comprises about 20 to 50 percent by weight aliphatics having from 5 to 7 carbon atoms, and about 50 to about 80 percent by weight aromatics and is recycled as reflux through line 18 to extractor 3 as previously described.

The water phase contains about 95 to about 99 percent by weight water, about 0 to about 5 percent by weight solvent, and about 0.1 to about 0.5 percent by weight aliphatics. It passes through line 31 and is split in two streams, lines 32 and 33, a raffinate wash stream and an aromatics wash stream, respectively. These washes can take place as shown by splitting the stream or the entire stream can be used to wash the raffinate first and then the aromatics providing that the water is treaed with an aromatics slipstream before the aromatics wash.

As noted heretofore, the side-stream distillate is withdrawn in vapor form from stripper 23 through line 26. It then passes through heat exchanger 34 where it converts at least a part of the stripping water to steam, a feature of this invention, and is condensed. The side-stream distillate (or condensate) continues along line 26 through cooler 35, which can be a heat exchanger or other cooling device, and is cooled to a temperature in the range of about 25° C. to about 50° C. The condensate then passes into aromatics decanter 36 where an aromatic hydrocarbons phase containing about 99.8 to about 99.9 percent by weight aromatics, and about 0.1 to about 0.2 percent by weight solvent and a water phase containing about 90 percent to about 98 percent by weight water, about 2 percent to about 10 percent by weight solvent, and about 0.1 percent to about 0.5 percent by weight aromatics are formed. The water phase passes through line 37 to water reservoir 51. Optionally, all or part of the water phase can be directed through valved line 38 to join line 32 for use as raffinate wash.

The aromatic hydrocarbons phase proceeds from decanter 36 through line 26 along which an aromatics slipstream is taken through line 14 to wash water coming from reflux decanter 29 along line 33. As noted, this slipstream can be in the range of about 0.10 percent to about 5.0 percent of the total aromatics in the feedstock and is preferably in the range of about 0.50 percent to about 2.0 percent of the total aromatics in the feedstock. These percentages are by weight.

In practice, the weight of the total aromatics is determined by analysis of a sample portion of the feedstock. Aromatics added, e.g., as slipstream, during the process cycle are included in the determination.

The slipstream can, alternatively, be obtained from another source such as the overhead product of the benzene fractionating column (connection not shown in the drawing) or from a source completely removed from the system. As long as the slipstream has the previously noted high aromatics content, it will be satisfactory in this process.

The combined streams of lines 33 and 14 proceed into wash extractor 39, which can be a single stage mixer-settler or other form of extractor. Where a mixer-settler is used, it is advantageous to use an aromatics recycle which passes along line 42 and joins lines 33 and 14 returning to wash extractor 39. The slipstream, now containing a small amount of aliphatics, passes overhead from wash extractor 39 into line 42 and along line 50 to join lines 12 and 15 and proceeds into wash extractor 13 as discussed previously.

Reflux water, now essentially free of aliphatics, is withdrawn from wash extractor 39 and proceeds along line 43, which joins line 26, and passes into aromatics extractor 44, which can be a single stage mixer-settler or other type of extractor. This reflux water, along with water recycled from the settling zone in the case of a mixer-settler via line 45, which joins line 43, and process makeup water from line 46 (source not shown) contacts the aromatic product proceeding along line 26 into aromatics extractor 44 and recovers essentially all of the small amount of solvent remaining in the aromatics. This water with solvent then proceeds along line 47 to join line 17, which joins line 37 and enters water reservoir 51. High purity aromatic product proceeds through line 26.

The removal of certain impurities, which may include some aliphatics, of a type which can build up in the system and affect it in a deleterious manner, is accomplished by taking a small purge of the water circuit. To accomplish this purge, water is withdrawn from any of the decanters and discarded periodically or continuously. One such purge can be accomplished through line 48. It is found that only a small proportion of the solvent is lost by such a purge; however, this solvent can be recovered if desired. The water purge stream can be in the range of about 0.25 percent to about 2.0 percent by weight of the total water in the system and is preferably in the range of about 0.5 percent to about 1.0 percent by weight of the water in the system.

The total water in the system can be determined easily because the amount of water introduced can be controlled. Allowances must be made for water losses through leakage, entrainment and upsets, however.

Solvent can be recovered from this purge by directing the water through line 49 to join line 53 and enter solvent regenerator 52 where the solvent is separated from low boiling and high boiling impurities by steam distillation under vacuum. The solvent is recovered and recycled along line 54 to extractor 3 (connection not shown) and the water and impurities discarded.

It will be noted that the slipstream taken through line 14 is first used to wash the water phase from reflux decanter 29 (i.e., one stream) and then the water phases from raffinate decanter 7 (optional) and raffinate extractor 8. This procedure can be varied so that a different slipstream from a different source is used for each wash or, as previously mentioned, a single slipstream is used to wash one water purge where stream 31 is not split, but is first used to wash raffinate.

It was stated heretofore that the slipstream picks up some aliphatics in extractor 39 before proceeding to extractor 13. It should be pointed out that the purity of this slipstream containing the small amount of aliphatics is only reduced by about one percent and that it still has a purity of at least about 95 percent by weight and preferably about 98 percent so that the definition of the slipstream with respect to purity is fulfilled.

The aromatics product proceeds along line 26 to benzene distillation column (or stripper) 62 where it enters at about the middle tray thereof. The temperature at the top of stripper 62 is at about the boiling point of benzene while the temperature at the bottom is in the range of about 80° C. to about 140° C. The pressure at the top of the column is critical. This pressure is subatmospheric, about 1 p.s.i.a. to about 12 p.s.i.a. It is preferably maintained in the range of about 3 p.s.i.a. to about 7 p.s.i.a. The pressure at the bottom of the column can reach as high as 20 p.s.i.a., but is usually between about 10 p.s.i.a. and about 15 p.s.i.a.

Benzene vapor of high purity is taken overhead through line 63 and a portion is returned to stripper 62 along line 64 as reflux. The ratio of the amount of product returned as reflux to the amount of product recovered from the column is known as the reflux ratio of the distillation column. The reflux ratio of stripper 62 is about 1:1 to about 15:1. The balance of the benzene vapor continues through line 63, is condensed, and goes to storage.

The balance of the aromatics passes as bottoms through line 74 where a portion is diverted and directed into reboilers (heat exchangers) 67, 66, and 65 where it is converted to vapor and returned to a point below the bottom tray of stripper 62 to provide its heating requirement. About half of the heat is supplied by the hot raffinate and/or hot extract passing through heat exchangers 66 and 67, respectively, and the balance of the heat is supplied by steam passing through the heating side of heat exchanger 65.

The amount of heat contributed by the raffinate to the benzene and toluene strippers varies with the aromatics content of the feedstock, which is also determinative as to whether the raffinate can be effectively used for preheating the feedstock or the overhead distillate is called upon to perform this task. Roughly speaking, where the feedstock contains less than about 50 percent by weight aromatics, the raffinate can be expected to contribute more than a quarter of the heating requirement for the benzene and toluene strippers and the full heating requirement for preheating the feedstock. Where the feedstock contains between about 50 percent and 75 percent by weight aromatics, the raffinate contributes sufficient heat to preheat the feedstock and where the feedstock contains more than 75 percent by weight aromatics, the overhead distillate is required to preheat the feed. In all cases, the heat from the extract supplies sufficient heat to make up about one half of the heating requirement for the benzene and toluene strippers. Where the raffinate can contribute very little or nothing to the heating requirement, the raffinate can be rerouted directly to the washing portion of the process described above. Alternatively, where sufficient heat is available raffinate can be routed to the benzene stripper reboiler and extract to the toluene stripper reboiler or vice versa depending on the heating requirements of the strippers, which, in turn, depends on the composition of the feedstock.

The balance of the bottoms or aromatics product from stripper 62 continues through line 74 to about the middle of stripper 68. The procedure and conditions, particularly the pressure at the top of the column, which is critical, in stripper 68 is the same as stripper 62 except that the temperature is higher to account for the boiling point of toluene. Therefore, the temperature at the top of the stripper is at the boiling point of toluene and the bottom temperature is in the range of about 100° C. to about 160° C. The toluene vapor of high purity is taken overhead through line 69 and a portion is returned as reflux through line 70. The reflux ratio is in the range of about 1:1 to about 10:1. The balance of the toluene is condensed and sent to storage. The bottoms or the balance of the aromatics product passes through line 75 where a portion is diverted and passed through reboilers (heat exchangers) 73, 72, and 71. Again, about half of the heating requirement is supplied by the raffinate and/or extract and the balance is supplied by steam passing through the heating side of heat exchanger 71. The balance of the aromatics product then proceeds to storage.

What is claimed is:

1. A continuous solvent extraction-steam distillation process for the recovery of aromatic hydrocarbons including benzene and toluene having boiling points in the range of about 80° C. to about 175° C. from a feedstock containing aliphatic hydrocarbons and said aromatic hydrocarbons comprising the following steps:

(a) contacting the feedstock in an extraction zone wherein the temperature is in the range of about 75° C. to about 200° C. with a mixture of water and a solvent, said solvent being a water-miscible organic liquid having a boiling point of at least about 200° C. and having a decomposition temperature of at least about 225° C., and with reflux hydrocarbons to provide an extract comprising aromatic hydrocarbons, reflux aliphatic hydrocarbons, solvent, and water and a raffinate comprising essentially aliphatic hydrocarbons;

(b) contacting the extract with steam in an aromatics distillation zone wherein the temperature is in the range of about 80° C. to about 200° C. to provide an overhead distillate comprising a reflux hydrocarbons phase and a water phase, a side cut distillate comprising an aromatic hydrocarbons phase and a water phase and bottoms comprising a mixture of solvent and water;

(c) dividing the water phase of the overhead distillate into first and second streams;

(d) contacting the raffinate with the first stream to provide an aliphatic hydrocarbons phase and a water phase;

(e) contacting the second stream with an aromatic hydrocarbons stream containing at least 95 percent aromatic hydrocarbons, the amount of said stream being in the range of about 0.1 percent to about 5 percent by weight of the total aromatic hydrocarbons in the feedstock, to form an aromatic hydrocarbons phase and a water phase;

(f) contacting the aromatic hydrocarbons phase of the side-cut distillate with the water phase of (e) to form an aromatic hydrocarbons phase and a water phase;

(g) contacting the water phase of step (d) with an aromatic hydrocarbons stream containing at least 95 percent aromatic hydrocarbons, the amount of said stream being in the range of about 0.1 percent to about 5 percent by weight of the total aromatic hydrocarbons in the feedstock, to form an aromatic hydrocarbons phase and a water phase;

(h) recycling the water phases of steps (f) and (g) to the aromatics distillation zone;

(i) recycling the reflux hydrocarbons phase of the overhead distillate and the bottoms of step (b) to the extraction zone to provide reflux hydrocarbons and mixture of water and solvent, respectively, for step (a);

(j) recovering the aliphatic hydrocarbons phase of step (d);

(k) introducing the aromatic hydrocarbons phase formed in step (f) into a benzene distillation zone wherein the temperature is at least as high as the boiling point of benzene and the pressure at the top of the zone is about 1 p.s.i.a. to about 12 p.s.i.a., and recovering the benzene as overhead therefrom;

(l) introducing the balance of the aromatic hydrocarbons from step (k) into a toluene distillation zone wherein the temperature is at least as high as the boiling point of toluene and the pressure at the top of the zone is about 1 p.s.i.a to about 12 p.s.i.a., and recovering the toluene as overhead therefrom; and (m) recovering the balance of the aromatic hydrocarbons from step (1);

wherein:

(i) prior to step (a), the feedstock is heated to a temperature in the range of about 50° C. to about 150° C. by heat exchange with one of the members of the group consisting of the overhead distillate and the raffinate;

(ii) prior to step (h), the water phases formed in steps (f) and (g) are converted at least in part to steam by heat exchange with the side-cut distillate; and (iii) prior to step (b), portions of the bottoms from the benzene distillation zone and the toluene distillation zone are heated by heat exchange with at least one member of the group consisting of the extract and the raffinate and recycled to their respective zones to provide about half of the heating requirement for that zone.

2. The process of claim 1 wherein the reflux aliphatic hydrocarbons contain from 5 to 7 carbon atoms.

3. The process of claim 2 wherein the pressure in the extraction zone is in the range of about 75 p.s.i.g. to about 200 p.s.i.g. and the pressure in the aromatics distillation zone is in the range of about 15 p.s.i.g. to about 40 p.s.i.g 4. The process of claim 3 wherein (i) the ratio of solvent to feedstock in the extraction zone is in the range of about 3 to about 12 parts by weight of solvent to one part by weight of feedstock;

(ii) the amount of water in the extraction zone is about 1 percent to about 8 percent by weight based on the weight of the solvent in said zone;

(iii) the ratio of reflux to feedstock in the extraction zone is in the range of about 0.5 to about 1.5 parts by weight of reflux to one part by weight of feedstock; and (iv) the ratio of water to aromatic hydrocarbons in the distillation zone is in the range of about 0.1 to about 0.5 part by weight of water to one part by weight of aromatic hydrocarbons in said zone.

5. The process of claim 4 wherein the solvent is a polyalkylene glycol.

6. The process of claim 5 wherein the solvent is tetraethylene glycol.

7. The process defined in claim 4 comprising the following additional steps:

(n) after step (a) and prior to step (d), separating the raffinate into an aliphatic hydrocarbons phase and a solvent phase; and (o) recycling the solvent phase of step (n) to the extraction zone.

8. The process defined in claim 7 comprising the following step:

(p) recycling the aromatic hydrocarbons phase formed in steps (e) and (g) to the extraction zone.

9. A continuous solvent extraction-steam distillation process for the recovery of aromatic hydrocarbons including benzene and toluene having boiling points in the range of about 80° C. to about 175° C. from a feedstock containing aliphatic hydrocarbons and said aromatic hydrocarbons comprising the following steps:

(a) contacting the feedstock in an extraction zone wherein the temperature is in the range of about 75° C. to about 200° C. with a mixture of water in a solvent, said solvent being a water-miscible organic liquid having a boiling point of at least about 200° C. and having a decomposition temperature of at least about 225° C., and with reflux hydrocarbons to provide an extract comprising aromatic hydrocarbons, reflux aliphatic hydrocarbons, solvent, and water and a raffinate comprising essentially aliphatic hydrocarbons;

(b) contacting the extract with steam in an aromatics distillation zone wherein the temperature is in the range of about 80° C. to about 200° C. to provide an overhead distillate comprising a reflux hydrocarbons phase and a water phase, a side cut distillate comprising an aromatic hydrocarbons phase and a water phase, and bottoms comprising a mixture of solvent and water;

(c) contacting the raffinate with the water phase of the overhead distillate to provide an aliphatic hydrocarbons phase and a water phase;

(d) contacting the water phase of step (c) with an aromatic hydrocarbons stream containing at least 95 percent aromatic hydrocarbons, the amount of said stream being in the range of about 0.1 percent to about 5 percent by weight of the total aromatic hydrocarbons in the feedstock, to form an aromatic hydrocarbons phase and a water phase;

(e) contacting the aromatic hydrocarbons phase of the side-cut distillate with the water phase of (d) to form an aromatic hydrocarbons phase and a water phase;

(f) recycling the water phase of step (e) to the aromatics distillation zone;

(g) recycling the reflux hydrocarbons phase of the overhead distillate and the bottoms of step (b) to the extraction zone to provide reflux hydrocarbons and mixture of water and solvent, respectively, for step (a);

(h) recovering the aliphatic hydrocarbons phase of step (c);

(i) introducing the aromatic hydrocarbons phase formed in step (e) into a benzene distillation zone wherein the temperature is at least as high as the boiling point of benzene and the pressure at the top of the zone is less than atmospheric pressure, and recovering the benzene as overhead therefrom;

(j) introducing the balance of the aromatic hydrocarbons from step (i) into a toluene distillation zone wherein the temperature is at least as high as the boiling point of toluene and the pressure at the top of the zone is less than atmospheric pressure, and recovering the toluene as overhead therefrom: and (k) recovering the balance of the aromatic hydrocarbons from step (j);

wherein:

(i) prior to step (a), the feedstock is heated to a temperature in the range of about 50° C. to about 150° C. by heat exchange with one of the members of the group consisting of the overhead distillate and the raffinate;

(ii) prior to step (f), at least part of the water phase formed in step (e) is converted to steam by heat exchange with the side-cut distillate; and (iii) prior to step (b), portions of the bottoms from the benzene distillation zone and the toluene distillation zone are heated by heat exchange with at least one member of the group consisting of the extract and the raffinate and recycled to their respective zones to provide about half of the heating requirement for that zone.

10. The process of claim 9 wherein the reflux aliphatic hydrocarbons contain from 5 to 7 carbon atoms.

11. The process of claim 10 wherein the pressure in the extraction zone is in the range of about 75 p.s.i.g. to about 200 p.s.i.g., and the pressure in the aromatics distillation zone is in the range of about 15 p.s.i.g. to about 40 p.s.i.g.

12. The process of claim 11 wherein:

(i) the ratio of solvent to feedstock in the extraction zone is in the range of about 3 to about 12 parts by weight of solvent to one part by weight of feedstock;

(ii) the amount of water in the extraction zone is about 1 percent to about 8 percent by weight based on the weight of the solvent in said zone;

(iii) the ratio of reflux to feedstock in the extraction zone is in the range of about 0.5 to about 1.5 parts by weight of reflux to one part by weight of feedstock; and (iv) the ratio of water to aromatic hydrocarbons in the distillation zone is in the range of about 0.1 to about 0.5 part by weight of water to one part by weight of aromatic hydrocarbons in said zone.

13. The process of claim 12 wherein the solvent is a polyalkylene glycol.

14. The process of claim 13 wherein the solvent is tetraethylene glycol.

15. The process defined in claim 12 comprising the following additional steps:

(l) after step (a) and prior to step (c), separating the raffinate into an aliphatic hydrocarbons phase and a solvent phase; and (m) recycling the solvent phase of step (l) to the extraction zone.

16. The process defined in claim 15 comprising the following additional step:

(n) recycling the aromatic hydrocarbons phase formed in step (d) to the extraction zone.

17. The process defined in claim 1 wherein the aromatic hydrocarbons stream contains about 98 percent by weight aromatic hydrocarbons.

18. The process defined in claim 6 wherein the aromatic hydrocarbons stream contains about 99 percent by weight aromatic hydrocarbons.

19. The process defined in claim 9 wherein the aromatic hydrocarbons stream contains about 98 percent by weight aromatic hydrocarbons.

20. The process defined in claim 14 wherein the aromatic hydrocarbons stream contains about 99 percent by weight aromatic hydrocarbons.

21. The process defined in claim 1 wherein the pressure at the top of the benzene and toluene distillation zones is in the range of about 1 to about 12 p.s.i.a.

22. The process defined in claim 9 wherein the pressure at the top of the benzene and toluene distillation zones is in the range of about 1 to about 12 p.s.i.a.

23. The process defined in claim 6 wherein the pressure at the top of the benzene and toluene distillation zones is in the range of about 3 to about 7 p.s.i.a 24. The process defined in claim 14 wherein the pressure at the top of the benzene and toluene distillation zones is in the range of about 3 to about 7 p.s.i.a.

References Cited

UNITED STATES PATENTS

| | | | |
|---|---|---|---|
| 3,173,966 | 3/1965 | Jones et al. | 208—321 |
| 3,179,708 | 4/1965 | Penisten | 208—321 |
| 3,436,435 | 4/1969 | Van Tassell | 208—321 |
| 3,642,614 | 2/1972 | Van Tassell | 208—321 |
| 3,461,066 | 8/1969 | Morris et al. | 208—321 |
| 3,639,497 | 2/1972 | Martel et al. | 260—674 |

DELBERT E. GANTZ, Primary Examiner

C. E. SPRESSER, Jr., Assistant Examiner

U.S. Cl. X.R.

208—323, 333; 260—674 S. E.